United States Patent [19]
Yuen

[11] Patent Number: 5,357,628
[45] Date of Patent: Oct. 18, 1994

[54] COMPUTER SYSTEM HAVING INTEGRATED SOURCE LEVEL DEBUGGING FUNCTIONS THAT PROVIDE HARDWARE INFORMATION USING TRANSPARENT SYSTEM INTERRUPT

[75] Inventor: Desmond Yuen, San Leandro, Calif.

[73] Assignee: Intel Corporation, Santa Clara, Calif.

[21] Appl. No.: 138,894

[22] Filed: Oct. 19, 1993

Related U.S. Application Data

[63] Continuation of Ser. No. 858,301, Mar. 25, 1992, abandoned.

[51] Int. Cl.$^5$ ............................................. G06F 11/00
[52] U.S. Cl. ........................... 395/575; 364/DIG. 1; 364/267.91
[58] Field of Search ................ 395/575; 364/267.91

[56] References Cited

U.S. PATENT DOCUMENTS 4,819,234  4/1989  Kuber ................................. 371/19
5,175,853  12/1992  Kardach et al. ................ 395/650

OTHER PUBLICATIONS

Source-Level In-Circuit Software Code Debugging Instrument.

Primary Examiner—Gareth D. Shaw
Assistant Examiner—A. Katbab
Attorney, Agent, or Firm—Blakely, Sokoloff, Taylor & Zafman

[57] ABSTRACT

A system management mode (SMM), an external dedicated system management memory (SMRAM), a system management interrupt (SMI), a SMI service handler with an integrated debugger, a Resume instruction (RSM), and at least one way for triggering a SMI as a result of a debugging request is provided to a computer system. Debugging is performed under SMM with the integrated debugger which is stored with the SMI handler in the SMRAM and given control after the SMI handler has gotten control and determined in its initial processings that the SMI handler has gotten control as a result of a SMI triggered by a debugging request. The SMI handler gets control after the computer system is put into SMM in response to the SMI. Upon exiting the integrated debugger, the SMI handler executes the RSM instruction to continue execution with the interrupted program. As a result, debugging may be performed with the actual hardware in its normal operating speed, and yet debugging functions and usability matching or exceeding that of a software emulator may be provided. Additionally, debugging may be performed in a manner that is transparent to the operating system and the application programs.

6 Claims, 2 Drawing Sheets

COMPUTER SYSTEM HAVING INTEGRATED SOURCE LEVEL DEBUGGING FUNCTIONS THAT PROVIDE HARDWARE INFORMATION USING TRANSPARENT SYSTEM INTERRUPT

This is a continuation of application Ser. No. 07/858,301, filed Mar. 25, 1992, now abandoned.

BACKGROUND OF THE INVENTION

1. Field of the Invention

The present invention relates to the field of computer systems, in particular, microprocessor based computer systems. More specifically, the present invention is related to the methods employed by these computer systems for debugging the computer system.

2. Background

Various approaches with varying degrees of sophistication and effectiveness in debugging computer systems, including microprocessor based computer systems, have been developed. In fact, often times, multiple approaches are employed to maximize the effectiveness of debugging.

One traditional approach employed by many computer systems is to provide diagnostic ports and corresponding read/write registers. For example, I/O Port 80H and its corresponding read/write register provided on a standard ISA system. Typically, external decode logics are coupled to the diagnostic ports for decoding the content of the registers and displaying diagnostic messages on a display device, for example, an array of LEDs. The approach is simple to implement. The obvious disadvantage is its limited functions and poor usability.

Another traditional approach employed by many computer systems is to provide emulation support logics and a special emulation pin to the CPU. The emulation support logics, when activated, floats all output to the CPU. For example, the on-board circuit emulation pin of the "Intel386 TM SL" CPU, manufactured by Intel Corporation of Santa Clara, Calif., the assignee of the present invention. Typically, an external emulation module with emulation logics is coupled to the special emulation pin to drive the output signals, thereby permitting testing of the computer system with the CPU installed. The approach is more difficult to implement, but it provides more debugging functions then the previous approach. However, usability is still generally poor. In addition, the approach also has the inherent disadvantage that execution is not performed in the system's normal execution speed. Thus, certain problems, particularly timing problems, might not be detectable.

Yet another traditional approach employed by many computer systems is to provide a software emulator for the computer system. For example, ICE-386 SL Emulator provided for the "Intel386 TM SL Superset" microprocessor system. The approach is more difficult to implement, but it provides more functions and better usability than the two previous approaches. The obvious disadvantage is the fact that execution is only emulated. Thus, many hardware problems may be undetectable.

Thus, it is desirable to have an improved approach to debugging a computer system where the execution is not emulated and yet the debugging functions and their usability match or exceed those offered by the emulation approach. As will be described, these objects and desired results are among the objects and desired results achieved by the present invention.

SUMMARY OF THE INVENTION

A method and apparatus for debugging a computer system is disclosed. Under the presently preferred embodiment of the present invention, debugging function is provided as an integral part of system management. A system management mode (SMM), an external dedicated system management memory (SMRAM), a system management interrupt (SMI), a SMI service routine having an integrated debugger, a resume instruction (RSM) and at least one mechanism to trigger a SMI as a result of a debugging request are provided to the computer system.

The integrated debugger is stored with the SMI handler in the SMRAM and given control after the SMI handler gets control and determined in its initial processings that the SMI handler gets control as a result of a SMI triggered by a debug request. The SMI handler get control after the computer system is put into SMM in response to the detected SMI. The SMI is a non-maskable interrupt with higher priority than all other interrupts of the computer system.

When entering SMM, the SMRAM is mapped into a predetermined segment of the memory address space, the system state at the time the SMI was detected is stored into the SMRAM, the CPU is switched into real mode, and the CPU control registers are reinitialized to the starting address of the SMI handler.

Upon exiting from the integrated debugger, the SMI handler executes the RSM instruction to take the computer system out of SMM. When exiting from SMM, the stored system state is restored, the SMRAM is unmapped from the memory address space, and the CPU continues execution with the next instruction of the interrupted program.

As a result, debugging may be performed using the actual hardware of the computer system in its normal operating speed. Debugging functions and usability matching or exceeding those offered by the software emulation approach may be provided. Additionally, the debugging is performed in a manner that is transparent to the operating system and the applications executed by the computer system.

BRIEF DESCRIPTION OF THE DRAWINGS

The objects, features and advantages of the present invention will be apparent from the following detailed description of the preferred embodiment of the invention with references to the drawings in which.

DETAILED DESCRIPTION PRESENTLY PREFERRED AND ALTERNATE EMBODIMENTS

A method and apparatus for debugging a computer system is disclosed. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

System Overview

Figure 1:
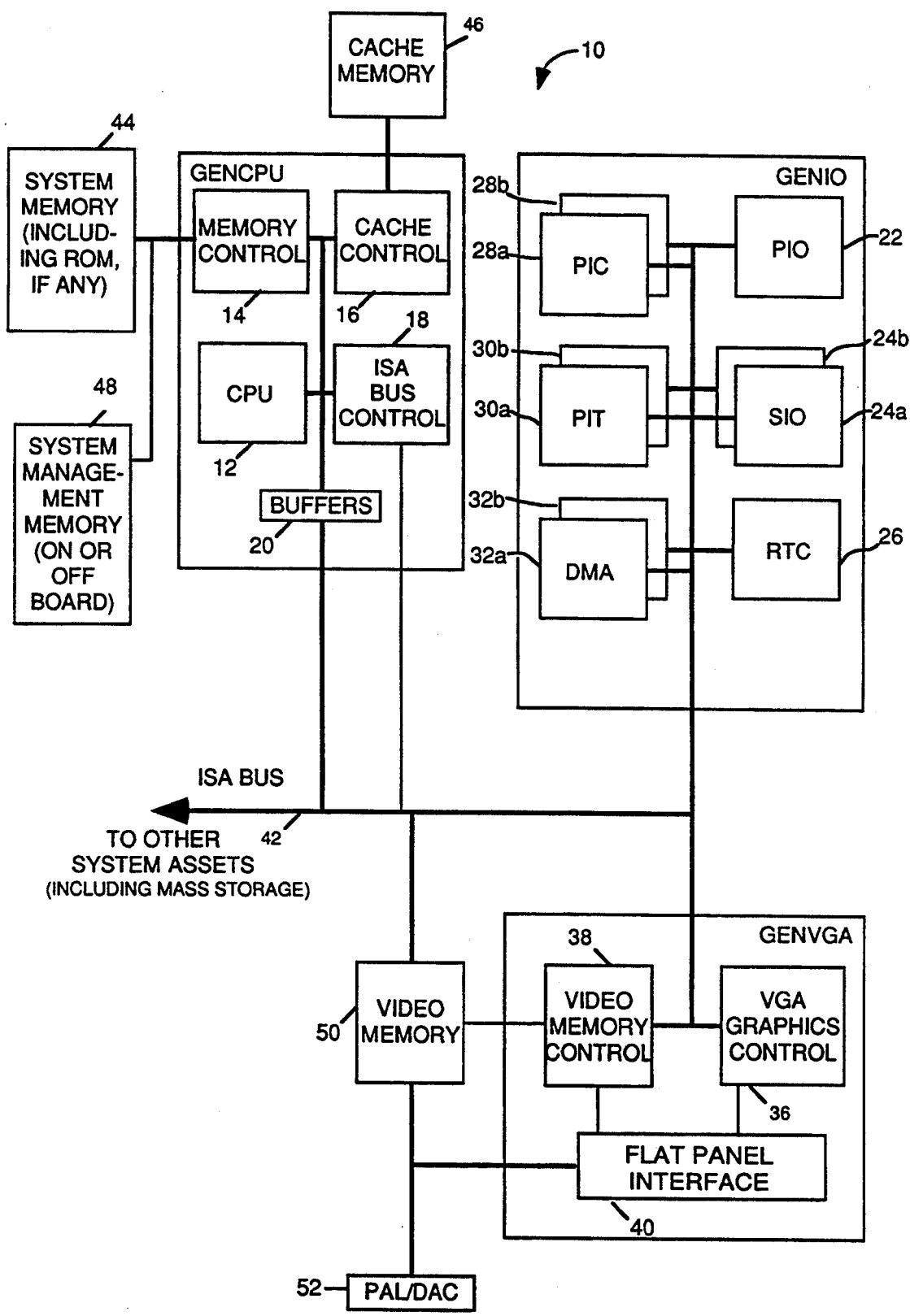
FIG. 1 is a functional block diagram of an exemplary microprocessor based computer system embodying the present invention.

Referring now to FIG. 1, a block diagram illustrating an exemplary microprocessor based computer system embodying the present invention is shown. The exemplary microprocessor based computer system 10 is briefly described below. The exemplary microprocessor based computer system 10 is essentially the "Intel386 TM SL Microprocessor Superset" manufactured by Intel Corporation, the corporate assignee of this invention. However, it is to be understood that the present invention is not limited to this particular microprocessor design, and may be incorporated in virtually any computer system design regardless whether it is microprocessor based.

Throughout this description, certain terminology relating to the "Intel386 TM SL Microprocessor Superset", such as register names, signal nomenclature, is employed to describe the present invention. Such terminology is understood by practitioners in the field of computer system design and will therefore not be explained at length herein.

The exemplary microprocessor based computer system 10 comprises three main components, designated as GENCPU, GENIO and GENVGA. GENCPU is an expanded central processing unit; GENIO is a single chip input/output unit; and GENVGA is a single chip graphics interface. The three components communicate with each other and with other system components (such as expansion slots, keyboard controller, disk controllers) via ISA bus 42.

GENCPU includes a CPU 12, a memory controller 14, a cache controller 16, ISA bus control logic 18 and line buffers 20. CPU 12 comprises a plurality of general registers (not shown), an instruction pointer register (not shown) containing an instruction pointer, and a prior instruction pointer register (not shown) containing a prior instruction pointer. The instruction pointer controls instruction fetching. CPU 12 automatically increments the instruction and prior instruction pointers to point to the next instruction to be executed and the instruction just executed respectively after executing an instruction. The CPU 12 also comprises debug read/write registers and debug I/O ports for interfacing with debugging functions disposed on logic external to the CPU for debugging the computer system.

CPU 12 also comprises logics (not shown) for executing a plurality of instructions. The instructions operate on either zero, one, or two operands. An operand either resides in the instruction, in a register or in a memory location. CPU 12 has two modes of operations, a real mode and a protected mode. The primary differences between the real mode and the protected mode is how a logical address is translated into a linear address, the size of the address space, and paging capability.

Additionally, CPU 12 comprises logics (not shown) for executing a plurality of hardware interrupts. Hardware interrupts occur as the result of an external event and are classified into two types: maskable and non-maskable. Interrupts are serviced after execution of the current instruction. After the interrupt service routine is finished with servicing the interrupt, execution proceeds with the instruction immediately after the interrupted instruction. Maskable interrupts are typically used to respond to asynchronous external hardware events. Unmaskable interrupts are typically used to service very high priority events.

GENIO includes parallel ports (PIO) 22, dual serial ports (SIO) 24a, 24b, real time clock unit (RTC) 26, dual programmable interrupt controllers (PIC) 28a, 28b, dual programmable timers (PIT) 30a, 30b, and dual direct memory access controllers (DMA) 32a, 32b and. GENVGA includes VGA graphics controller 36, video memory controller 38 and interface 40 for a flat panel display unit.

Additionally, external to the three main components are system memory 44, cache memory 46, system management memory 48, video memory 50, and an interface (PAL/DAC) 52 for a conventional VGA monitor. The external system memory 44 and system management memory 48 are accessed by the memory controller 14. The cache memory 46 and the video memory 50 are accessed by the cache memory controller 16 and video memory controller 38 respectively. The video memory 50 may also be accessed through the ISA bus 42, and the two interfaces 40, 52.

Although the system memory 44 and the system management memory 48 are shown to be separate and external to the basic components GENCPU, GENIO and GENVGA of the exemplary microprocessor based computer system 10, it will be appreciated that the system memory 44 as well as the system management memory 48 may be integrated and/or internal to the one of the basic component, for example GENCPU. However, by keeping the system memory 44 and the system management memory 48 separate and external, the present invention may be practiced with the added advantage of debugging system memory 44 failures.

For further description of the "Intel386 TM SL" Microprocessor Superset, see Intel386 TM *SL Microprocessor Superset Programmer's Reference Manual*, published by Intel Corporation as publication number 240815, and related publications.

System Management and Debugging

Figure 2:
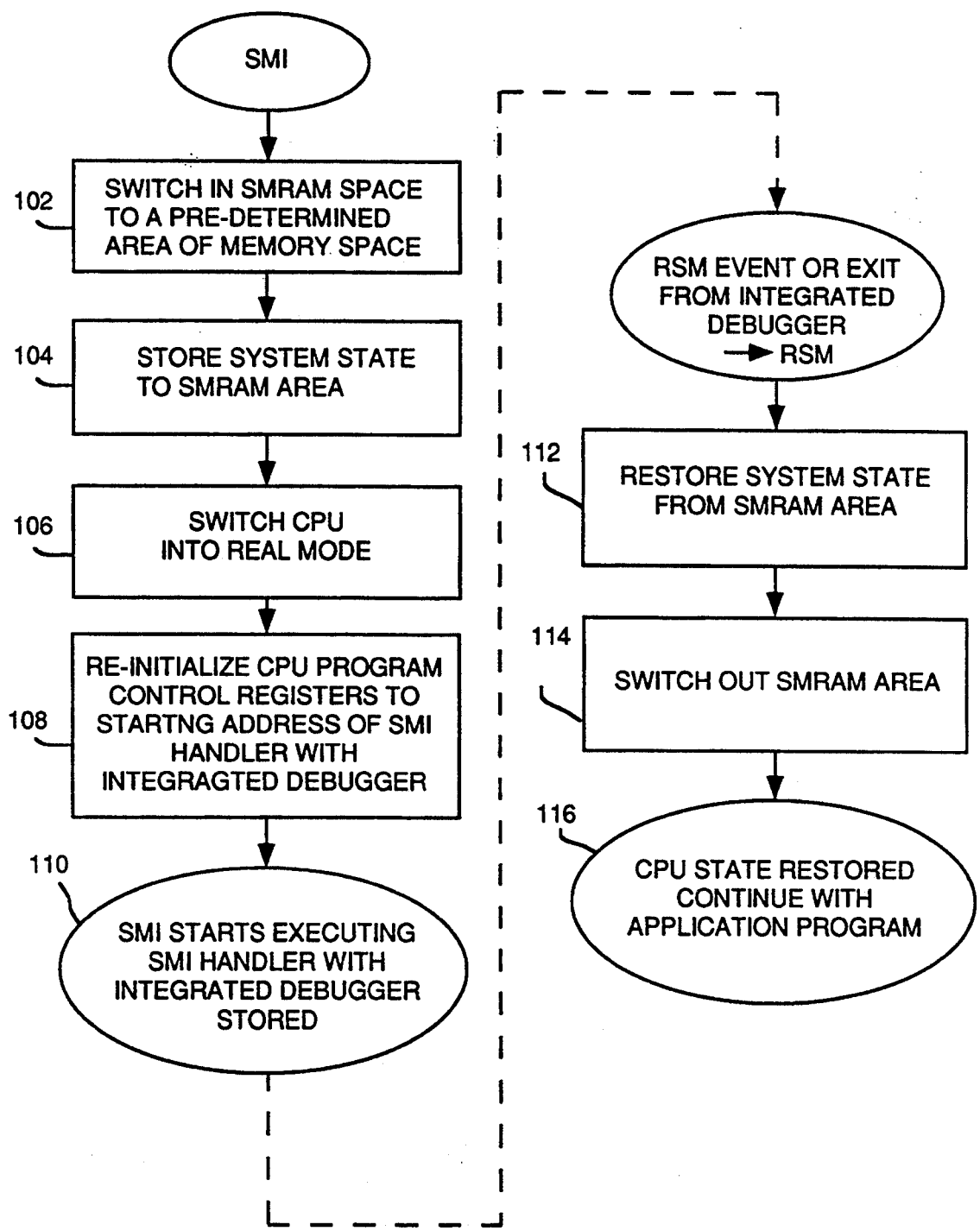
FIG. 2 is a flow diagram for system management and debugging on the exemplary microprocessor based computer system of FIG. 1.

Referring now to FIG. 2, a block diagram illustrating the operation flow of system management and debugging on the exemplary microprocessor based computer system illustrated in FIG. 1. Debugging is implemented as integral part of system management on the exemplary microprocessor based computer system. System management and integrated debugging on the exemplary microprocessor based computer system is implemented as follows:

1. A system management mode (SMM) is provided to the computer system. Debugging and various other system management functions are performed under SMM. A particular example of other system management function is power management.

2. A system management interrupt (SMI) is provided to put the computer system into SMM. The SMI is a non-maskable interrupt having higher priority than all other interrupts, including other non-maskable interrupts.

3. A SMI handler having an integrated debugger is provided to the computer system to service the SMI. The SMI handler determines the SMI triggering event and performs system management functions accordingly, invoking its integrated system management function handlers such as the integrated debugger if necessary. The integrated debugger provides debugging functions such as displaying register contents, displaying memory contents, displaying interrupt vector locations, displaying BIOS data areas, editing register and/or memory contents, establishing break points for I/O and memory accesses, single stepping execution.

4. An external and dedicated system management memory (SMRAM) is provided to the computer system for storing the SMI handler with its integrated system management function handlers including the integrated debugger, and the system state of the computer system at the time the SMI is detected. SMRAM is mapped into the computer system's memory address space only under SMM.

5. A resume instruction (RSM) is provided for returning the computer system to the state just before the SMI was detected and resuming execution at the next instruction of the interrupted program.

6. Various mechanisms are provided for triggering a SMI, including at least one mechanism for triggering a SMI in response to a debugging request. Particular examples of mechanisms for triggering a SMI are external SMI pin, software SMI event trap, local and global timers.

7. Various mechanisms are provided for generating RSM events. An RSM event causes the SMI handler to execute the RSM instruction to return the computer system to the state just before the SMI was detected. Particular examples of mechanisms for triggering an RSM event are system event and I/O traps.

Upon detection of a SMI including a SMI triggered in response to a debugging request, the computer system is put into SMM. When putting the computer system in SMM, the SMI microcode maps the SMRAM to a predetermined area of main memory space, block 102. As described earlier, the SMRAM is normally not mapped as part of the main memory space, thereby making it inaccessible to the operating system and the applications. Additionally, the SMI microcode saves the system state of the computer system from the CPU into the SMRAM space, block 104, switches the CPU into real mode, block 106, re-initializes the CPU's program control registers to the starting address of the SMI handler, block 108, and starts execution of the SMI handler, block 110.

Upon determining in its initial processings that the SMI was triggered by a debugging request, the SMI handler transfers control to the integrated debugger, otherwise, the SMI handler performs appropriate system management functions invoking other embedded system management function handlers if necessary. Once the integrated debugger gets control, various debugging functions may be performed using the debugging functions provided, including debugging memory problems if the SMRAM is implemented with external memory that is separate from the system memory.

Upon exiting from the integrated debugger or detecting a RSM event if the integrated debugger is not in control, the SMI handler executes the RSM instruction to take the computer system out of SMM and restore it to the state just before the SMI was detected. The RSM microcode restores the system state stored in the SMRAM area to the CPU, block 112, switches out the SMRAM area and unmaps it as part of the main memory space, block 114, and continues execution of the interrupted program, block 116.

It will be appreciated that debugging is performed using the actual hardware of the computer system at its normal operating speed, and yet debugging functions and usability matching or exceeding that of those offered by the software emulation approach may be offered by the integrated debugger. It will also be appreciated that debugging performed under SMM is transparent to the operating system and the application programs being executed by the computer system.

Additionally, it will be appreciated that as an alternate embodiment, the integrated debugger may be stored in its own separate ROM or on mass storage. The separately stored integrated debugger may be loaded by the SMI handler as part of the initial processings upon determining that the SMI was triggered by a debugging request.

Furthermore, it will also be appreciated that as an alternate embodiment, the present invention may be practiced with a stand alone debugger having its own separate debugging mode, debugging interrupt, debugging memory, and debugging interrupt triggering mechanisms that are similar to the SMM, SMI, SMRAM and mechanisms for triggering a SMI described above.

For further description of system management and its various extensions and applications on the "Intel1386 TM SL" Microprocessor Superset, see Intel1386 *TM SL Microprocessor Superset Programmer's Reference Manual,* published by Intel Corporation as publication number 240814, and related publications. Additionally, please see copending U.S. Pat. applications, Ser. No. 07/753,605, entitled *Transparent System Interrupts with Integrated Extended Memory Addressing,* Ser. No. 07/753,327, entitled *Transparent System Interrupts with Automated Halt Restart,* Ser. No. 07/753,107, entitled *Transparent System Interrupts with Automated Input/Output Trap Restart,* Ser. No. 07/886,965, entitled *Methods & Apparatus For Servicing Transparent System Interrupts and Reducing Interrupt Latency,* Ser. No. 07/858,323, entitled *Method and Apparatus for Saving a System Image Onto Permanent Storage That is Operating System Independent,* and Ser. No. 07/594,278, *Transparent System Interrupt.*

Other Variations

While the method of the present invention has been described in terms of its presently preferred and alternate embodiments, those skilled in the art will recognize that the method of the present invention is not limited to the embodiments described. The method of the present invention may be practiced with modification and alternation within the spirit and scope of the appended claims. The specifications and drawings are, accordingly, to be regarded in an illustrative rather than a restrictive sense.

What is claimed is:

1. An improved computer system comprising a central processing unit (CPU) coupled to at least one memory unit for executing at least an operating system comprising a plurality of said CPU's instructions, said CPU further having at least two modes of program execution, a real mode and a protected mode, and at least one interrupt for interrupting program execution, wherein the improvement to said computer system comprises:

(a) a dedicated memory area in said at least one memory unit, said dedicated memory area being not mapped as part of main memory space thereby keeping said dedicated memory area inaccessible to said operating system and other programs, if any, executed by said CPU;

(b) an interrupt processing program, having source level debugging functions, for serving an unmaskable interrupt and allowing a user to perform source level debugging and have access to hardware information, said interrupt processing program being prestored in said dedicated memory area;

(c) said at least one interrupt of said computer system including said unmaskable interrupt for interrupting execution of said operating system and other programs, if any, causing said dedicated memory area to be switched in and mapped to a pre-determined segment of said main memory space, storing said current system state data of said computer system into said dedicated memory area, switching said CPU into said real mode of execution, reinitializing said CPU's control registers to a predetermined address, and starting execution of said interrupt processing program including said debugging functions in said real mode, said unmaskable interrupt being unmaskable by said operating system and said other programs if any, and having a higher priority than other interrupts, said predetermined address being starting address of said interrupt processing program;

(d) interrupt triggering means for detecting a debugging request and triggering said unmaskable interrupt upon detecting said debugging request; and (e) resumption means for restoring said saved system data in said CPU upon completion of said debugging performed by said user, causing said dedicated memory area to be switched out and unmapped from said main memory space, and resuming execution of said operating system and other program, if any;

whereby allowing said user to perform said debugging and have access to hardware information without having to use an external emulator.

2. The computer system as set forth in claim 1, wherein, said improvement further comprises:

said interrupt processing program providing other system management functions;

said debugging functions being provided by an integrated debugger;

said interrupt triggering means also triggering said interrupt due to other system management events;

said integrated debugger being given control upon determining by initial processings of said interrupt processing program that said interruption was made in response to a debugging request;

resume event detection means for detecting a resume event; and said resumption means restoring said saved system state data in said CPU upon exiting said integrated debugger if said interruption was made in response to a debugging request, otherwise, upon detection of a resume event by said interrupt processing program.

3. The computer system as set forth in claim 2, wherein, said improvement further comprises said integrated debugger being stored with said interrupt processing program in said dedicated memory area.

4. The computer system as set forth in claim 2, wherein, said improvement further comprises said integrated debugger being stored separately in a selected one of its own read-only-memory and mass storage, said integrated debugger being loaded by said interrupt processing program after said initial processings and determination.

5. The computer system as set forth in claim 1, wherein, said improvement further comprises said at least one memory unit having an on-board random access memory (RAM), and said dedicated memory area being part of said on-board RAM.

6. The computer system as set forth in claim 1, wherein, said improvement further comprises said at least one memory unit having an off-board RAM coupled to an on-board RAM controller, and said dedicated memory area being part of said off-board RAM.

* * * * *